United States Patent
Tseng et al.

(10) Patent No.: US 9,275,258 B2
(45) Date of Patent: Mar. 1, 2016

(54) VERIFYING SYSTEM AND A METHOD THEREOF

(71) Applicants: DADNY INC., Taipei (TW); CeraMicro Technology Corp., Taipei (TW)

(72) Inventors: Ming-Huang Tseng, Taipei (TW); Ching-Yi Wu, Hsinchu (TW); Daniel Shih, Taipei (TW)

(73) Assignees: PRICEPLAY TAIWAN INC., Taipei (TW); CERAMICRO TECHNOLOGY CORP., Taipei (TW)

( * ) Notice: Subject to any disclaimer, the term of this patent is extended or adjusted under 35 U.S.C. 154(b) by 73 days.

(21) Appl. No.: 13/873,999

(22) Filed: Apr. 30, 2013

(65) Prior Publication Data
US 2014/0111305 A1   Apr. 24, 2014

(30) Foreign Application Priority Data
Oct. 19, 2012  (TW) .............................. 101138743 A

(51) Int. Cl.
- G08B 23/00 (2006.01)
- G06K 5/00 (2006.01)
- G06Q 30/02 (2012.01)

(52) U.S. Cl.
CPC . *G06K 5/00* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 2005/0259818 | A1* | 11/2005 | Silverbrook et al. | 380/55 |
| 2008/0002882 | A1* | 1/2008 | Voloshynovskyy et al. | 382/181 |
| 2009/0140040 | A1* | 6/2009 | Wang et al. | 235/380 |
| 2009/0188971 | A1* | 7/2009 | Chambon et al. | 235/375 |
| 2012/0143671 | A1* | 6/2012 | Hansen et al. | 705/14.39 |

FOREIGN PATENT DOCUMENTS

TW   M 423879   3/2012

\* cited by examiner

*Primary Examiner* — Ojiako Nwugo
(74) *Attorney, Agent, or Firm* — Muncy, Geissler, Olds & Lowe, P.C.

(57) ABSTRACT

This invention discloses a verifying system and method thereof. The verifying system comprises a plurality of objects to be verified and a verifying end. Each of the objects to be verified respectively comprises an identifying code. The verifying end has a database, and the database stores a plurality records of information of the objects respectively corresponding to each of the indentifying codes. When a user utilizes an electronic device to read one of the indentifying codes for making the electronic device connect to the verifying end, the verifying end compares the identifying code with the plurality records of information of the objects to generate an information of verification results which is then transmitted back to the electronic device. Herewith the effect of the present invention being verifying authenticity of the object by the indentifying code is achieved.

14 Claims, 6 Drawing Sheets

VERIFYING SYSTEM AND A METHOD THEREOF

CROSS-REFERENCE TO RELATED APPLICATION

This application claims the benefit of Taiwan Patent Application No. 101138743, filed on Oct. 19, 2012, in the Taiwan Intellectual Property Office, the disclosure of which is incorporated herein in its entirety by reference.

BACKGROUND OF THE INVENTION

1. Field of the Invention

The present invention generally relates to a verifying system and a method thereof, and more particularly to a verifying system and a method thereof by use of reading the identifying codes to connect and to perform the identification.

2. Description of the Related Art

Going along with continuous improvements in technology, the technique for manufacturing products develops in accordance with it as well. Therefore, many illegal producers manufacture a lot of counterfeits. And many counterfeits produced by the high-level technology are sold in markets so that the customers get confused of whether the object is a real Mccoy or a counterfeit.

In addition, after doing lots of research, the developers of the original object share achievements with illegal producers. Thus, some developers of the original object gradually give up developing new products and this condition affects developments in each of the current manufacturing. Based on it, some of the other developers of the original object start developing the anti-fake technique. Taking the Taiwanese patent "the anti-fake system to identify the products using bar codes," with No. M423879 for example, it discloses: printing the products order number on the package or the label of the product in the form of a character or a bar code, and then an electronic product having the capacity of connection performs a verifying program with anti-fake capacity and connects to a programming module at the verifying end to receive the verifying order and to connect the central module of the database for performing verification and receiving the feedback. However, according to above mentions, there are many shortcomings in prior art. For example, the products order number is directly disposed on the outward or the outer surface of the product in the form of the character or the bar code in prior art. This condition may cause the real customer or the user gets a message of error because the fake customer did the action of verification; the verification could not be performed until the manufacturer or the verifying end uses the program, and this requisite causes a trouble or inconvenience to the customer or the user. On the other hand, if the illegal producer counterfeits the products order number, the verifying end still has to perform the comparison or the verification one by one, and this condition becomes a heavy burden on the verifying end.

In summation of the problems described above, the inventor of the present invention considers and designs a verifying system and method thereof to overcome the shortcomings in current technique and further to improve the implement and usage in manufacturing.

SUMMARY OF THE INVENTION

Based on the aforementioned problems in prior arts, the objective of the present invention is to provide a verifying system and a method thereof to solve the problem of the difficulty of identifying the object being a real Mccoy or a counterfeit.

In accordance with the objective of the present invention, a verifying system is provided. The system comprises a plurality of objects to be verified and a verifying end. A plurality of identifying codes are respectively disposed thereon. The verifying end includes a database; and the database stores a plurality records of information of the objects respectively corresponding to the identifying codes. After one of the identifying codes is read by an electronic device, the electronic device connects to the verifying end; and the verifying end compares the identifying code that is read with the plurality records of information of the objects to generate an information of verification results which is then transmitted back to the electronic device.

Preferably, when the identifying code that is read corresponds to one of the plurality records of information of the object, the verifying end stores a paired message to the records of information of the object.

Preferably, when the identifying code that is read gets read once again, the verifying end generates and transmits the information of the verification results including the paired message to the electronic device.

Preferably, the identifying code that is read includes a piece of encrypted information, the verifying end determines whether the comparison between the identifying code that is read and the plurality records of information of the objects performs or not in accordance with the encrypted information.

Preferably, the information of verification results comprises a connecting link of reporting arranged for the electronic device to generate a piece of reporting information to be transmitted to the verifying end.

Preferably, each of the objects to be verified comprises a packaging unit, the packaging unit is used to cover a body of the object to be verified, and the identifying code that is read is disposed on an internal surface of the packaging unit or on the body of the objects to be verified covered with the packaging unit.

Preferably, the electronic device performs an identifying program of a third party to read or to identify the identifying code that is read.

Preferably, the identifying code that is read further comprises an internet address, the electronic device identifies the internet address in accordance with the identifying code that is read and then connects to the verifying end.

Preferably, the identifying code that is read is just one or an assemblage from a group of a character, a symbol, an image, a bar code, and an identifying code of the wireless radio.

In accordance with the objective of the present invention, a verifying method is further provided. The method comprises the following steps of providing a plurality of identifying codes to be respectively disposed on a plurality of objects to be verified; providing a verifying end including a database, which stores a plurality records of information of the objects that respectively correspond to the plurality of identifying codes; reading one of the plurality of the identifying codes by a using end to identify the identifying code that is read and then connecting to the verifying end in accordance with the identifying code that is read for comparing with the plurality records of information of the objects; and generating an information of the verification results by the verifying end to transmit to the using end.

Preferably, the method further comprises the following steps of: affirming whether the identifying codes that is read corresponds to the information of one of the objects via comparison by the verifying end; and affirming the identifying codes that is read corresponds to the information of one of the objects via comparison by the verifying end, the verifying end stores a paired message to the records of information of the object.

Preferably, when the identifying code that is read gets read once again, the verifying method further comprises the following step of: generating the information of the verification results including the paired message by the verifying end to transmit to the using end.

Preferably, the identifying code that is read includes an encrypted information, further comprising the following step of:

determining whether the comparison between the identifying code that is read and the plurality records of information of the objects performs or not in accordance with the encrypted information by the verifying end.

Preferably, the information of the verification results comprises a connecting link of reporting, further comprising the following steps of: selecting the connection link of reporting; and generating a piece of reporting information from the using end to be transmitted to the verifying end.

In summation of the description above, the verifying system and the method thereof of the present invention includes one or more advantages as follows:

(1) By obtaining the information of verification results via reading the identifying codes, the verifying system and the method thereof can improve the convenience of verifying the genuinity of the object for the user.

(2) By obtaining the information of verification results including pair messages, the verifying system and the method thereof can improve the convenience of verifying the usage or the replacement of the object for the user.

(3) By placing the identifying codes inside, the verifying system and a method thereof can effectively reduce the identifying code being verified with a bad intention.

(4) By adding the encrypted information to the identifying codes, the verifying system and the method thereof can effectively reduce the loading on the verifying end.

(5) By performing the verification via using the identifying program currently used very often, the verifying system and the method thereof can effectively improve the convenience of verification.

DETAILED DESCRIPTION OF THE PREFERRED EMBODIMENTS

The technical contents and characteristics of the present invention will be apparent with the detailed description of a preferred embodiment accompanied with related drawings as follows. For simplicity, the same numerals are used for the same respective elements in the description of the following preferred embodiments and the illustration of the drawings.

Except extra definitions, the terminology (including technical and scientific terminology) and proper nouns used later contain the same meanings as those known by the person skilled in the art of the present field in practical. For example, the terminology defined in common used dictionaries should be realized having the identical meanings as it in contents of the related field. And except being defined in latter sections of the specification, its meanings should not extremely ideally or extremely formally be understood.

Figure 1:
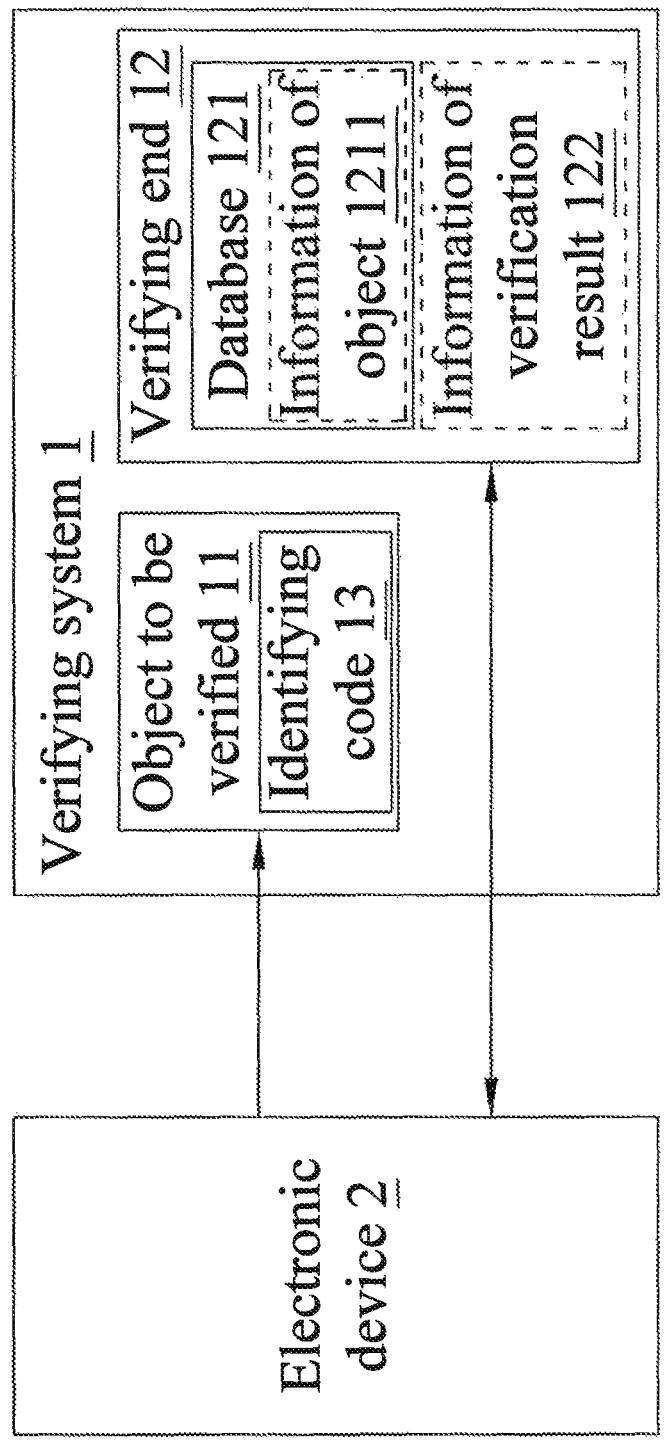
FIG. 1 is a block diagram of the first preferred embodiment of the verifying system of the present invention

With reference to FIG. 1 for a block diagram of the first preferred embodiment of the verifying system of the present invention. The verifying system 1 of the present invention comprises a plurality of objects to be verified 11 and a verifying end 12. A plurality of unrepeatable identifying codes 13 are respectively disposed on each of the plurality of objects to be verified 11. And the identifying codes 13 are generated by the generator of the identifying codes and further disposed on each of the plurality of objects to be verified 11. The verifying end 12 includes a database 121. The database 121 stores a plurality records of information of the objects 1211 respectively corresponding to each of the identifying codes 13. That is, an identifying code 13 corresponds to a piece of information of the objects 1211.

When the user utilizes an electronic device 2 to read one of the identifying code 13 disposed on the plurality of objects to be verified 11, the electronic device 2 connects to the verifying end 12 in accordance with the content provided by the identifying code 13, and transmits the identifying code 13 to the verifying end 12. At the same time, the verifying end 12 compares the identifying code 13 that is transmitted with the plurality records of information of the objects 1211 to check whether they are matched with each other and to generate a piece of information of verification results 122 which is then transmitted back to the electronic device 2 in order to provide to the user.

Figure 2:
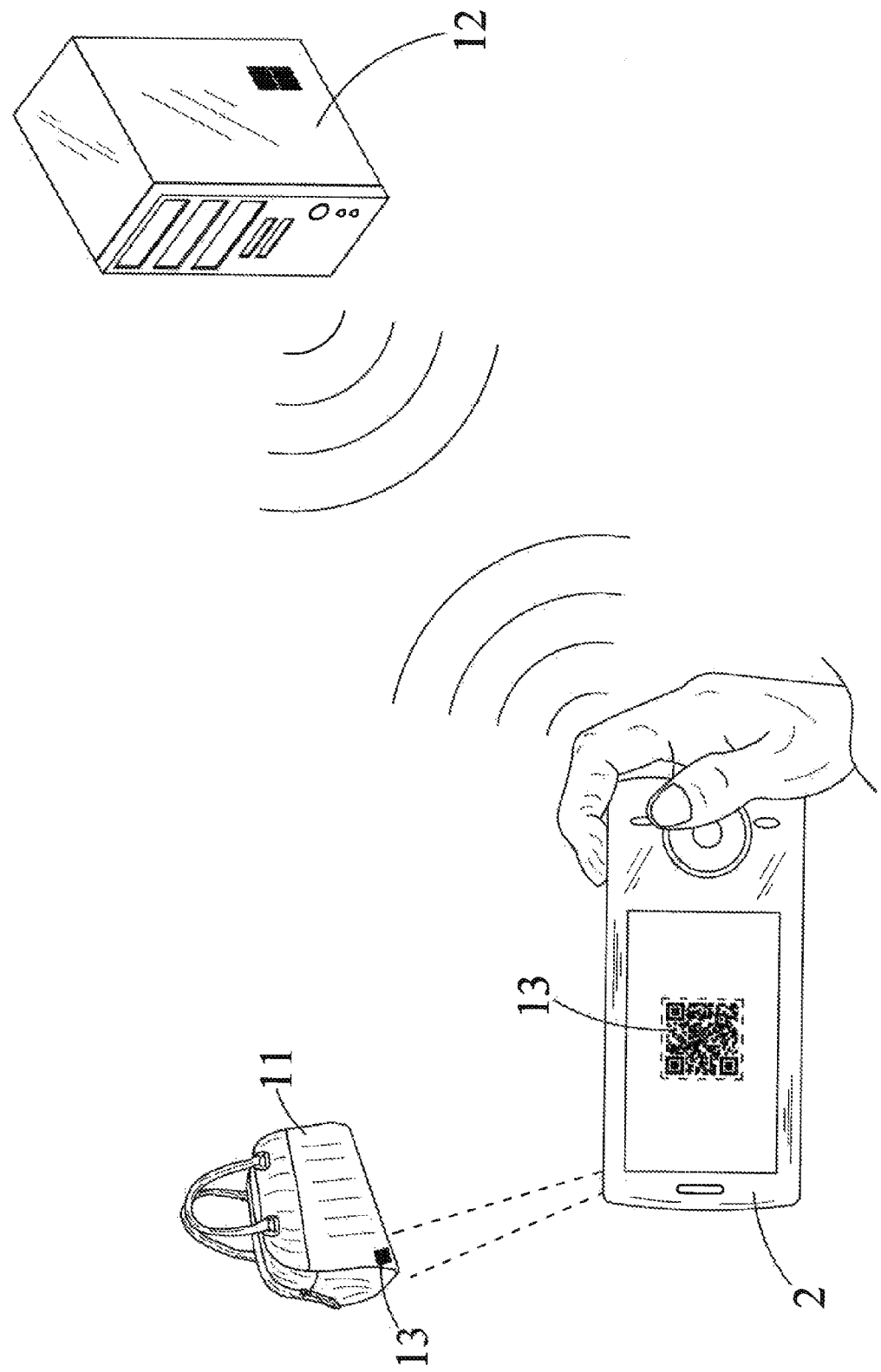
FIG. 2 is a schematic diagram of the first preferred embodiment of the verifying system of the present invention.

With reference to FIG. 2 for a schematic diagram of the first preferred embodiment of the verifying system of the present invention. Specially, a provider may use the generator of the identifying codes to generate a plurality of identifying codes 13, which are then disposed on the plurality of objects to be verified 11 by the way of attachment or printing, and the products are shipped to the physical stores or the virtual stores on the internet. On the other hand, the provider stores the plurality records of information of the objects 1211 respectively corresponding to the identifying code 13 into the database 121 of the verifying end 12. The identifying code 13 is coded as a character, a symbol, an image, a bar code, an identifying code of the wireless radio or any combination thereof. In the present embodiment, QR code, a two-dimension identifying code, is taken for example. In addition, the provider and the verifying end 12 may be the same unit or two units cooperating with each other according to the protocol. The present invention is not limited to such arrangement only When the user purchases an object to be verified 11 from the physical stores or the virtual stores on the internet, he can realize whether the object to be verified 11 is sold by the real provider by using the identifying code 13. When the user intends to verify the object, he can use the electronic device 2 (the easily portable electronic device such as smart phone, PDA, tablet computer or the laptop, etc.) to read or to acquire the identifying code 13. At the same time, the electronic device 2 connects to the verifying end 12 in accordance with an internet address provided by the identifying code 13, and transmits the identifying code 13 to the verifying end 12. It is noteworthy that the electronic device 2 may read or acquire the identifying code 13 by using its imaging module coupled with the identifying program of a third party (such as the currently widespread used QR CODE identifying program), not limited to the verifying program provided by the provider or the verifying end, which can read or identify the identifying code. The technique of how the electronic device 2 reads or acquires the identifying code 13 would not be described in detail.

Next, the verifying end 12 compares the identifying code 13 that is transmitted with the plurality records of information of the objects 1211 to generate a piece of information of verification results 122 which is then transmitted back to the electronic device 2 in order to provide the user an idea that whether this purchased product is really provided by its actual provider. In addition, the information of verification results 122 may include the message related to the object to be verified 11. For example, the manufacturing date, the life time, the way to use, the habitat or the component and so on may be provided as references to the user. If the message provided by the information of verification results 122 shows the object to be verified 11 is not provided by the actual producer, the user can reply a piece of reporting information to inform the verifying end 12 with the relative message (such as the store of the purchase, etc.), such that the verifying end 12 can trace the source of the product. Wherein the user can reply the reporting information in such a way that the information of verification results 122 further comprises a connection link of reporting, and the user can directly select and connect to relative interfaces (such as the phone number, message, email box or the homepage or verifying program provided by the provider or the verifying end, etc.) to make a feedback.

It is noteworthy that the verifying code 13 may comprise a piece of encrypted information. When the electronic device 2 connects to the verifying end 12, the verifying end 12 can fast and simply identify the verifying code 13 coming from the verifying end 12 or the original provider in accordance with the encrypted information. If the verifying code 13 does not come from the verifying end 12 or the original provider, the verifying end 12 directly generates the information of verification results 122. If the verifying code 13 comes from the verifying end 12 or the original provider, the verifying end 12 performs the subsequent comparison process.

Figure 3:
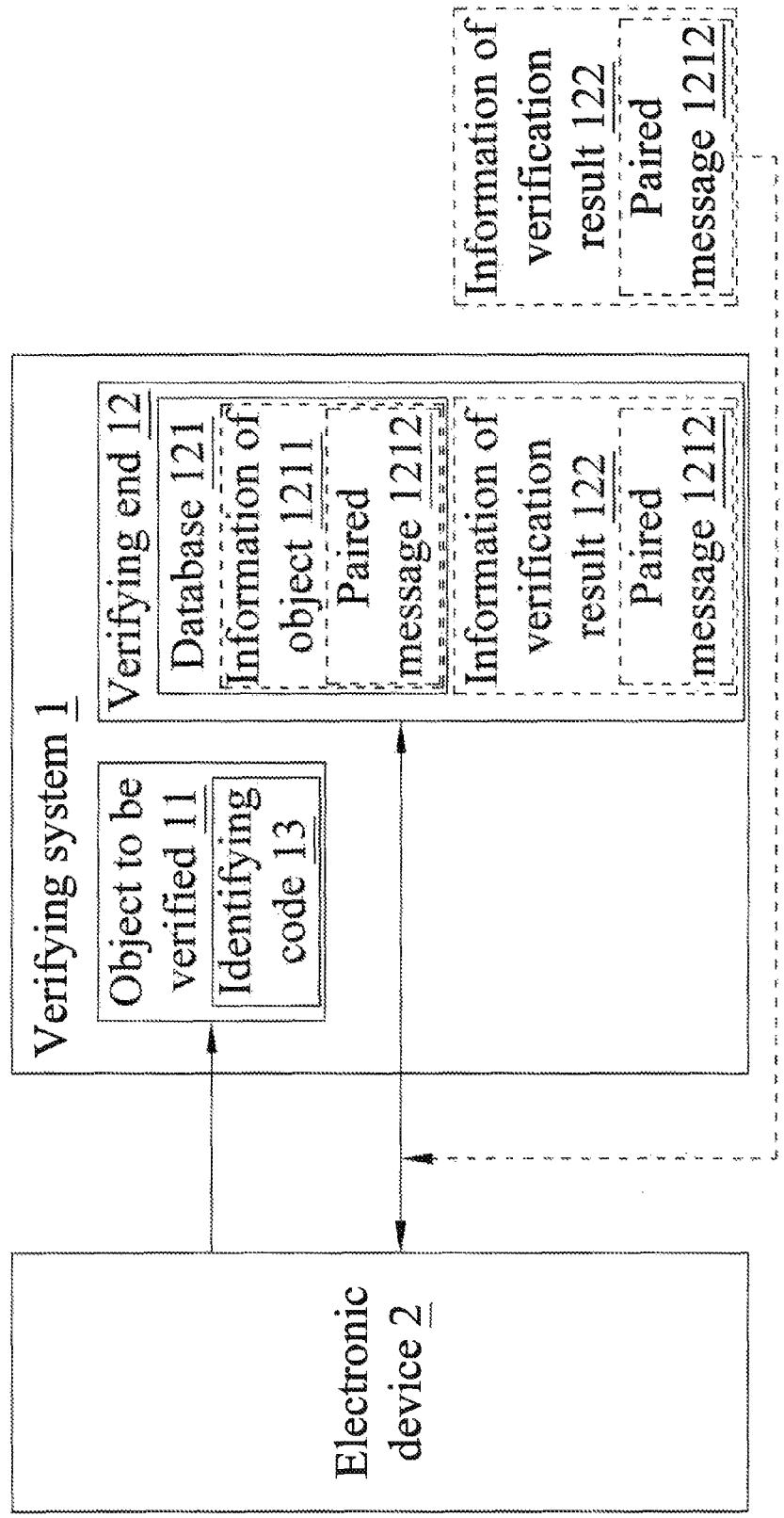
FIG. 3 is a block diagram of the second preferred embodiment of the verifying system of the present invention.
Figure 4:
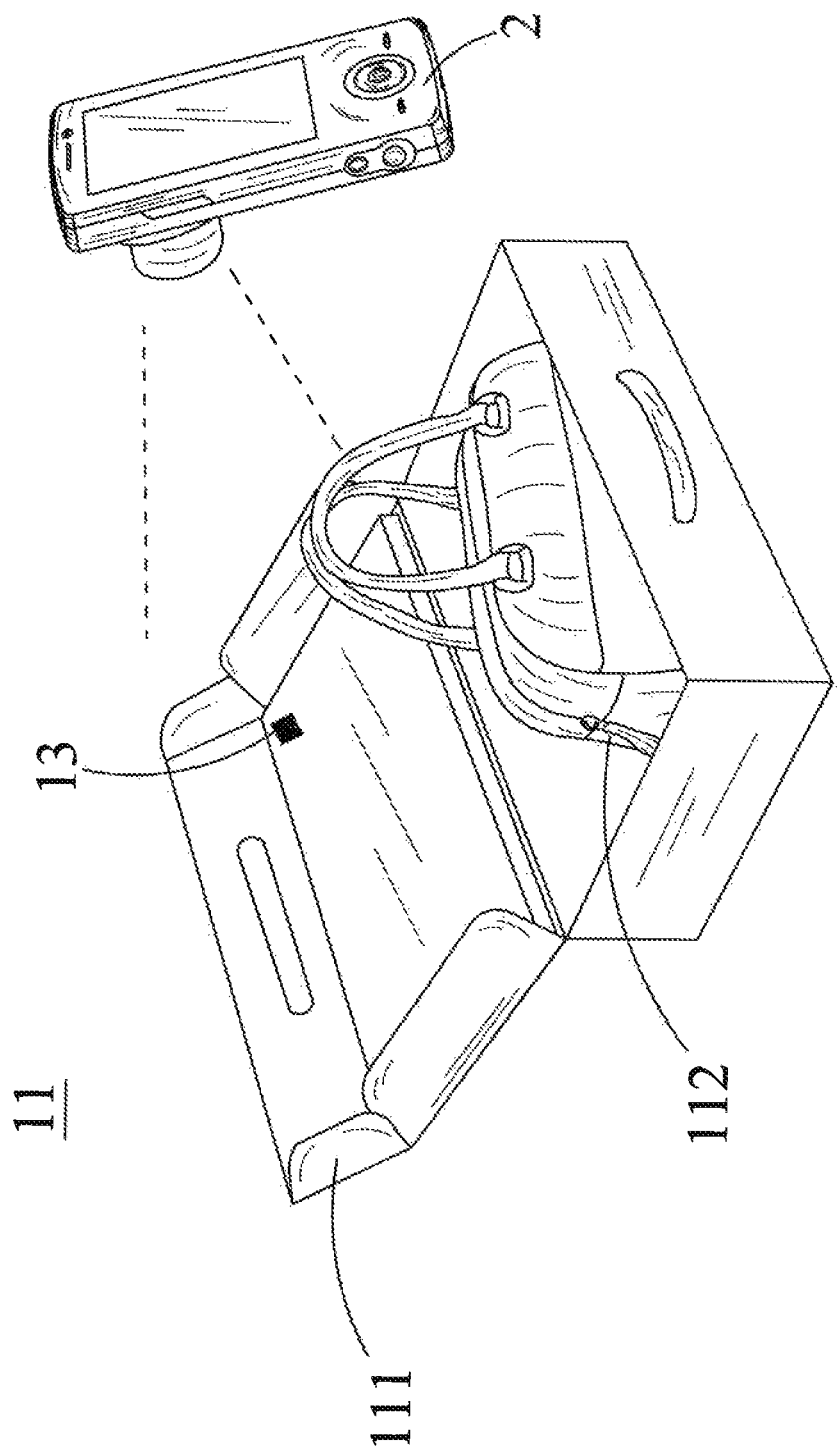
FIG. 4 is a schematic diagram of the second preferred embodiment of the verifying system of the present invention.

With reference to FIG. 3 and FIG. 4 for a block diagram and a schematic diagram of the second preferred embodiment of the verifying system of the present invention. In the present embodiment, the arrangement of each element is similar to the previous embodiment.

In this embodiment, each of the objects to be verified 11 comprises a packaging unit 111 and a body of the object to be verified 112. The packaging unit 111 is used to cover the body of the object to be verified 112. And the identifying code 13 is disposed on an internal surface of the objects to be verified 112 by the provider or the verifying end 12 covered with the packaging unit 111 or on the body of the objects to be verified 112 covered with the packaging unit 111. Simply speaking, the identifying code 13 is disposed on a position where the user can use an electronic device 2 to read it after the object to be verified is uncovered. On the other hand, when the verifying code discovers the transmitted identifying code 13 corresponds to one of the plurality records of information of the objects 1211 after comparison, the verifying end 12 immediately generates a paired message 1212 and stores it in the corresponding information of the objects 1211. And when the identifying code 13 which was read before is read once again, the verifying end 12 generates the information of verification results 122 comprising the paired message 1212 in accordance with the paired message 1212 within the plurality records of information of the objects 1211 and transmits it to the electronic device 2 for providing it to the user.

That is, when the user purchases an object to be verified 11 and uses the electronic device to read the identifying code 13 after uncovering it, if the information of verification results 122 fed back to the electronic device 2 shows a paired message 1212, the object to be verified 11 purchased by the user was possibly uncovered before and the components (such as the body of the object to be verified 112) may be possibly used or substituted previously.

Figure 5:
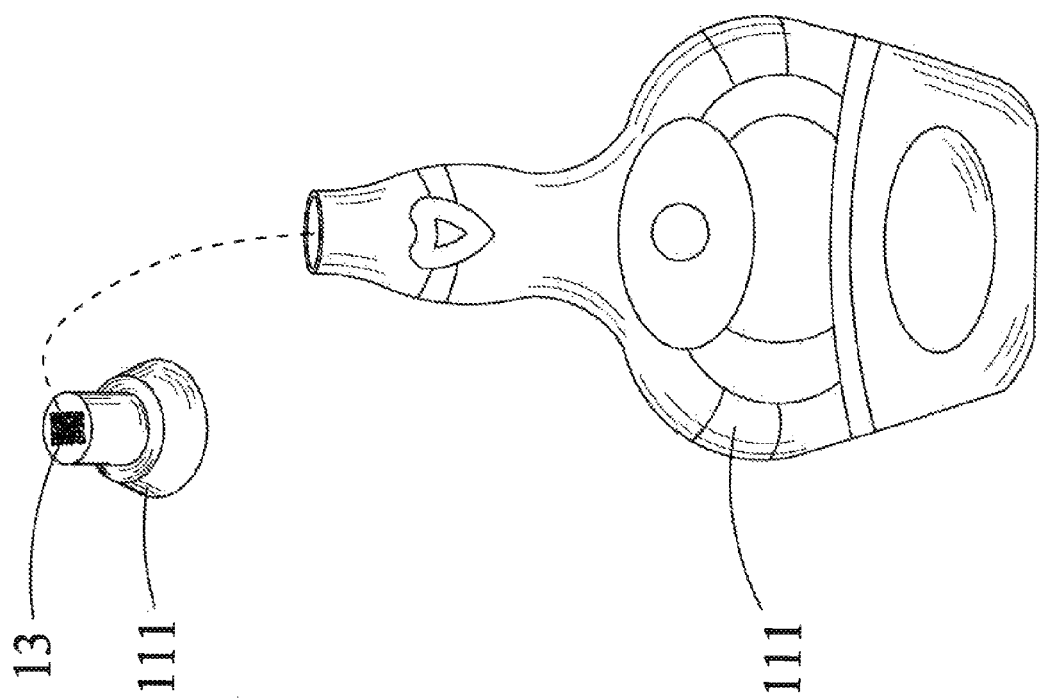
FIG. 5 is a schematic diagram of the third preferred embodiment of the verifying system of the present invention.

With reference to FIG. 5 for a schematic diagram of the third preferred embodiment of the verifying system of the present invention. In the present embodiment, wine is taken for example and the packaging unit 111 is also taken as an example of the bottle containing wine together with the cork or the cap. In the present embodiment, the identifying code 13 is disposed on one side (preferably on the outer side) of the cork or the cap. When the cork or the cap is disposed on the opening of the bottle, the identifying code 13 must be disposed on the position where the user can read it after the object to be verified is uncovered. And the user can use the method mentioned above to verify whether the object to be verified is a counterfeit and whether the component was uncovered or substituted.

Figure 6:
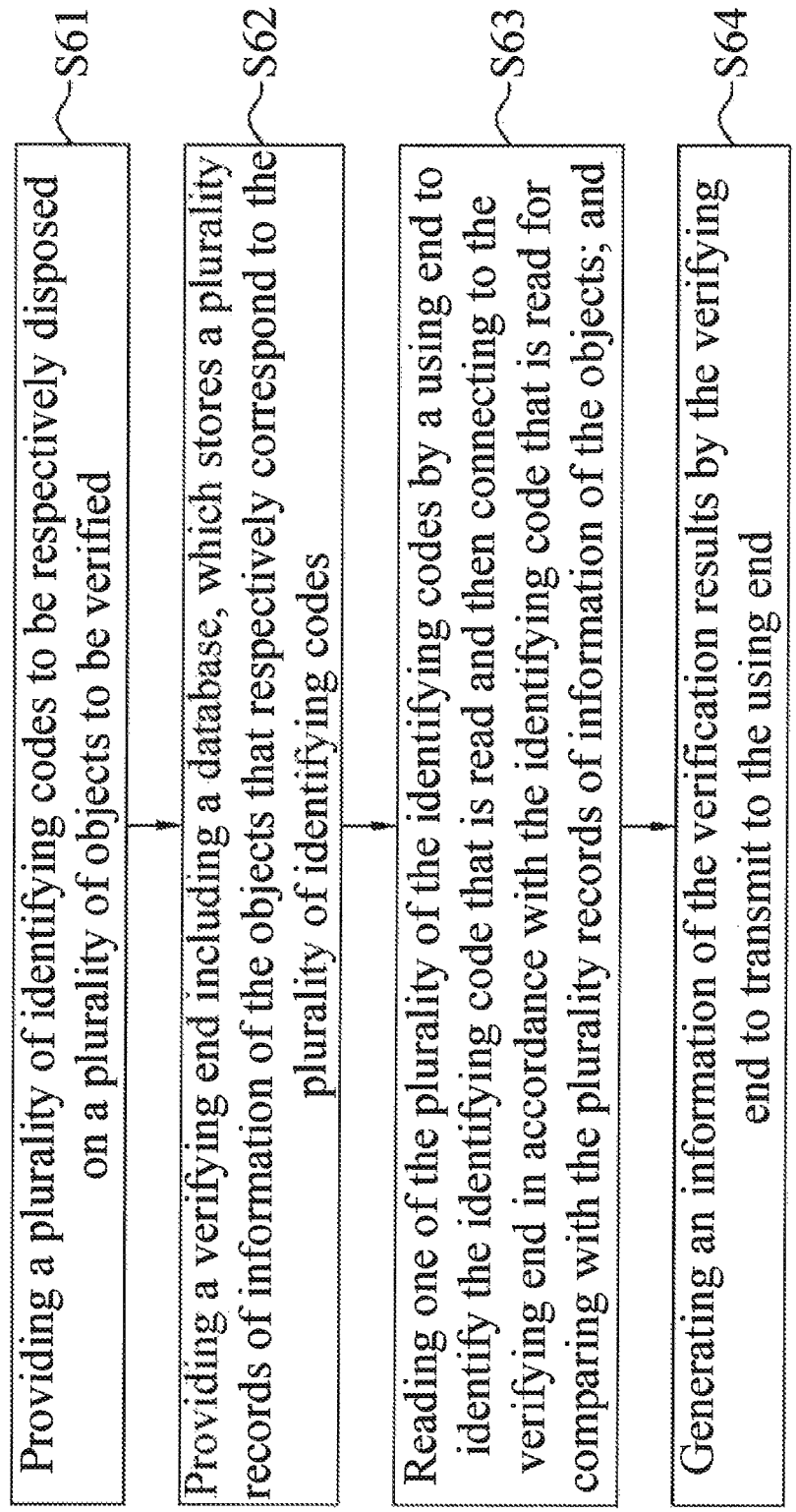
FIG. 6 is a flow chart of the verifying method of the present invention.

With reference to FIG. 6 for a flow chart of the verifying method of the present invention. The verifying method of the present invention is suitable to a verifying system. The verifying method comprises the following steps of:

(S61) providing a plurality of identifying codes to be respectively disposed on a plurality of objects to be verified;

(S62) providing a verifying end including a database, which stores a plurality records of information of the objects that respectively correspond to the plurality of identifying codes;

(S63) reading one of the plurality of the identifying codes by a using end to identify the identifying code that is read and then connecting to the verifying end in accordance with the identifying code that is read for comparing with the plurality records of information of the objects; and (S64) generating a piece of information of the verification results by the verifying end to transmit to the using end.

The detailed description of the preferred embodiments of the verifying method was described as well when the verifying system of the present invention was described above. Therefore, the detailed description is not repeated here. By the way, in the verifying system mentioned above, that the user utilizes the electronic device to read the identifying code is taken as an example of the using end of the present verifying method.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A verifying system, comprising:
    a plurality of objects to be verified, a plurality of identifying codes respectively disposed thereon; and
    a verifying end including a database, the database storing a plurality records of information of the objects respectively corresponding to the identifying codes;
    wherein after one of the identifying codes is read by an electronic device, the electronic device connects to the verifying end, and the verifying end compares the identifying code that is read with the plurality records of information of the objects to generate an information of verification results which is then transmitted back to the electronic device;

wherein the information of verification results comprises a connecting link of reporting arranged for the electronic device to generate a piece of reporting information associated to the verified objects to be transmitted to the verifying end, such that the verifying end is able to trace sources of each of the verified objects; and wherein the identifying code that is read includes a piece of encrypted information, the verifying end identifies code source of the identifying code according to the piece of encrypted information, and the verifying end determines whether the comparison between the identifying code that is read and the plurality records of information of the objects performs or not in accordance with the code source.

2. The verifying system of claim 1, wherein when the identifying code that is read corresponds to one of the plurality records of information of the object, the verifying end stores a paired message to the records of information of the object.

3. The verifying system of claim 2, wherein when the identifying code that is read gets read once again, the verifying end generates and transmits the information of the verification results including the paired message to the electronic device.

4. The verifying system of claim 1, wherein each of the objects to be verified comprises a packaging unit, the packaging unit is used to cover a body of the object to be verified, the identifying code that is read is disposed on an internal surface of the packaging unit or on the body of the objects to be verified covered with the packaging unit.

5. The verifying system of claim 1, wherein the electronic device performs an identifying program of a third party to read or to identify the identifying code that is read.

6. The verifying system of claim 1, wherein the identifying code that is read further comprises an internet address, the electronic device identifies the internet address in accordance with the identifying code that is read and then connects to the verifying end.

7. The verifying system of claim 1, wherein the identifying code that is read is just one or an assemblage from a group of a character, a symbol, an image, a bar code, and an identifying code of the wireless radio.

8. A verifying method, comprising:
providing a plurality of identifying codes to be respectively disposed on a plurality of objects to be verified;
providing a verifying end including a database, which stores a plurality records of information of the objects that respectively correspond to the plurality of identifying codes;
reading one of the plurality of the identifying codes by a using end to identify the identifying code that is read and then connecting to the verifying end in accordance with the identifying code that is read for comparing with the plurality records of information of the objects; and
generating an information of the verification results by the verifying end to transmit to the using end;
wherein the information of the verification results comprises a connecting link of reporting, further comprising the following steps of:
selecting the connection link of reporting;
generating a piece of reporting information associated to the verified objects from the using end to be transmitted to the verifying end, such that the verifying end is able to trace sources of each of the verified objects; and
wherein the identifying code that is read includes an encrypted information, further comprising the following step of:
identifying code source of the identifying code according to the piece of encrypted information by the verifying end;
determining whether the comparison between the identifying code that is read and the plurality records of information of the objects performs or not in accordance with the code source by the verifying end.

9. The verifying method of claim 8, further comprising the following steps of:
affirming whether the identifying codes that is read corresponds to the information of one of the objects via comparison by the verifying end; and
affirming the identifying codes that is read corresponds to the information of one of the objects via comparison by the verifying end, the verifying end stores a paired message to the records of information of the object.

10. The verifying method of claim 9, wherein when the identifying code that is read gets read once again, the verifying method further comprises the following step of:
generating the information of the verification results including the paired message by the verifying end to transmit to the using end.

11. The verifying method of claim 8, wherein the using end performs an identifying program of a third party to read or to identify the identifying code that is read.

12. The verifying method of claim 8, wherein each of the objects to be verified comprises a packaging unit, the packaging unit is used to cover a body of the object to be verified, the identifying code that is read is disposed on an internal surface of the packaging unit or on the body of the objects to be verified covered with the packaging unit.

13. The verifying method of claim 8, wherein the identifying code that is read further includes an internet address, further comprising the following step of:
the using end identifying the internet address in accordance with the identifying code that is read and then linking to the verifying end.

14. The verifying method of claim 8, wherein the identifying code that is read is just one or an assemblage from a group of a character, a symbol, an image, a bar code, and an identifying code of the wireless radio.

* * * * *